United States Patent [19]

Ikawa

[11] Patent Number: 4,942,340
[45] Date of Patent: Jul. 17, 1990

[54] ARRANGEMENT FOR DISPLAYING OPERATION OF BOOSTER CIRCUIT FOR FLASH DEVICE CAMERA

[75] Inventor: Kazuo Ikawa, Kanagawa, Japan

[73] Assignee: Canon Kabushiki Kaisha, Tokyo, Japan

[21] Appl. No.: 284,762

[22] Filed: Dec. 12, 1988

Related U.S. Application Data

[63] Continuation of Ser. No. 790,081, Oct. 22, 1985, abandoned.

[30] Foreign Application Priority Data

Oct. 23, 1984 [JP] Japan ................................ 59-223711
Feb. 12, 1985 [JP] Japan ................................ 60-025892
May 14, 1985 [JP] Japan ................................ 60-102438

[51] Int. Cl.$^5$ ............................................ H05B 41/32
[52] U.S. Cl. ............................ 315/241 P; 315/209 R; 315/DIG. 4; 315/DIG. 7; 315/291
[58] Field of Search ............. 315/240, 241 P, 241 S, 315/207 R, 291, 276, DIG. 1, DIG. 4, DIG. 7, DIG. 5, 241 R

[56] References Cited

U.S. PATENT DOCUMENTS

| 4,404,497 | 9/1983 | Takematsu | 315/241 P |
| 4,430,602 | 2/1984 | Ohmori | 315/241 P |
| 4,441,774 | 4/1984 | Kazami et al. | 315/241 P |
| 4,495,447 | 1/1985 | Shigemi | 315/241 P |
| 4,555,648 | 11/1985 | Iida et al. | 315/241 P |
| 4,602,194 | 7/1986 | Numata | 315/241 P |
| 4,610,521 | 9/1986 | Inoue | 315/241 P |
| 4,626,748 | 12/1986 | Nakamura | 315/241 P |
| 4,628,229 | 12/1986 | Inoue | 315/241 P |

OTHER PUBLICATIONS

Japanese Laid-Open Patent Application Sho 59-148298.

Primary Examiner—Leo H. Boudreau
Assistant Examiner—Michael Razavi
Attorney, Agent, or Firm—Toren, McGeady & Associates

[57] ABSTRACT

In the oscillating booster circuit of an electronic flash device for a camera arranged to boost the output of a DC low voltage source by a blocking oscillator circuit and to make it into a DC high voltage through a high voltage rectifier diode before a main capacitor of the flash device is charged therewith, a booster circuit operation display arrangement is operated solely by the spike voltage of the booster circuit to stably display the operating state of the booster circuit.

3 Claims, 6 Drawing Sheets

ARRANGEMENT FOR DISPLAYING OPERATION OF BOOSTER CIRCUIT FOR FLASH DEVICE CAMERA

This is a continuation application of Ser. No. 790,081filed Oct. 22, 1985, now abandoned.

BACKGROUND OF THE INVENTION

1. Field of the Invention:

This invention relates to an arrangement for displaying the operating state of a booster circuit of a flash device for a camera and more particularly and to an improvement on such arrangement which is capable of making a stable display.

2. Description of the Prior Art:

Heretofore, a conventional arrangement for displaying the operating state of a booster circuit of an electronic flash device for a camera has been arranged to obtain a supply of power for a display element 61 thereof directly from a power source battery 62, as shown in FIG. 1 of the accompanying drawings. However, during a period from the start of operation of the booster circuit and to the end of a charging process on a main capacitor 63, the voltage of the power source battery greatly varies causing the display brightness of the display element 61 to fluctuate.

This is due to a current of several amperes being drawn out from the battery 62 during the initial stages of operation of the booster circuit to resulting in an extremely great drop of voltage between the terminals of the battery 62, as shown in FIG. 2. When the battery 62 has been consumed to a certain degree, the brightness of the display element 61 drops to hindering ready confirmation of the operating stage of the booster circuit. Further, even in the case where the booster circuit is in an inoperative state due to some malfunction thereof, erroneous closing of a power supply switch 64 sometimes has occasioned the display element 61 to light up.

Meanwhile, if the resistance value of a resistor 65 is arranged to be small for the purpose of making the display element 61 sufficiently bright from the beginning of the operation of the booster circuit, the consumption of current by the display element 61 increases as the voltage between the terminals of the battery 62 recovers, accordingly as the charging voltage of the main capacitor 63 rises. That arrangement thus accelerates the consumption of the battery 62.

SUMMARY OF THE INVENTION

It is an object of the present invention to provide an arrangement for displaying the operating state of an oscillating booster circuit of an electronic flash device of a camera, wherein a display circuit is arranged to be operated solely by a spike voltage of the booster circuit and to be capable of always stably displaying the operating state of the booster circuit.

The above and further objects and features of this invention will become apparent from the following detailed description of embodiments thereof taken in conjunction with the accompanying drawings.

DETAILED DESCRIPTION OF THE PREFERRED EMBODIMENTS

Figure 1:
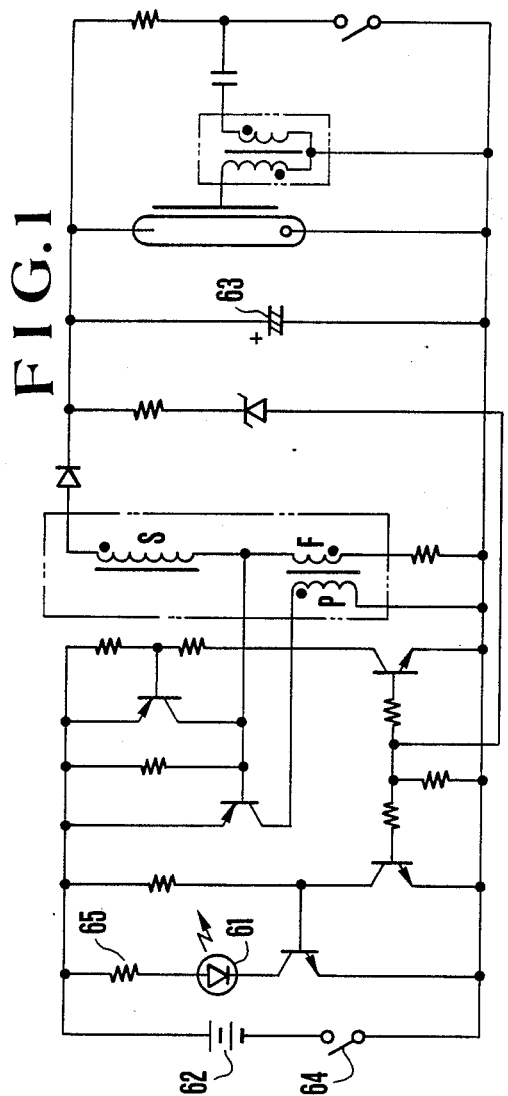
FIG. 1 is a circuit diagram showing the conventional electronic flash circuit for a camera.
Figure 2:
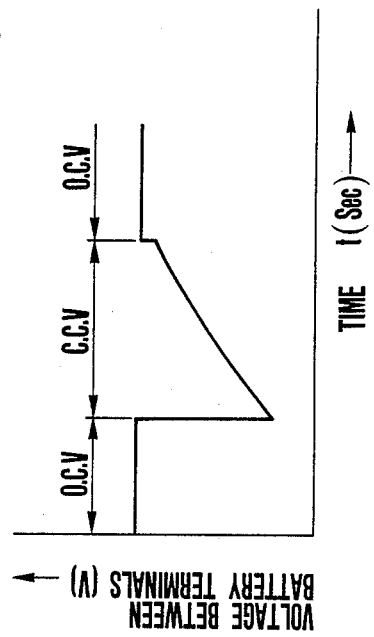
FIG. 2 is a waveform chart showing the operating waveform of a voltage between the terminals of a power source battery shown in FIG. 1.
Figure 3:
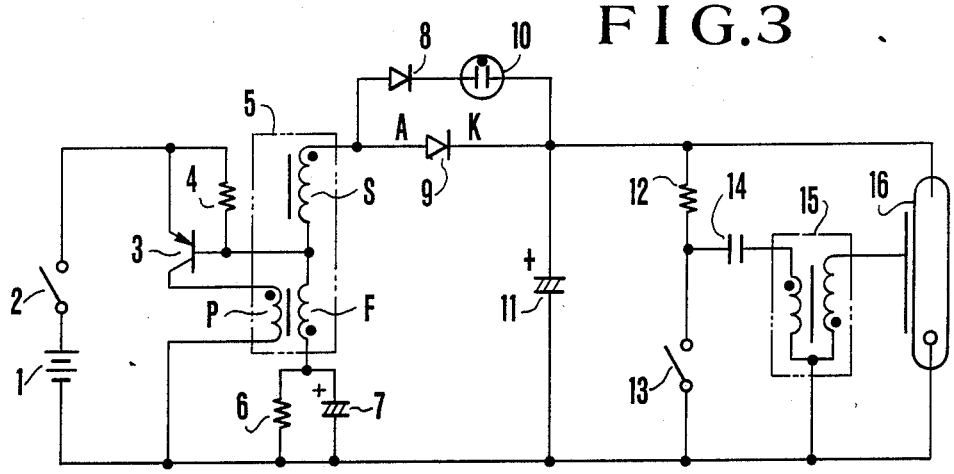
FIG. 3 is a circuit diagram showing an electronic flash circuit for a camera arranged according to this invention as a first embodiment thereof.

The following describes the embodiments of this invention with reference to the accompanying drawings, in which: FIG. 3 shows a flash circuit for a camera arranged according to this invention as a first embodiment thereof. The illustration includes a battery 1 which is arranged to serve as a power source; a power supply switch 2; an oscillating transistor 3; a resistor 4; an oscillating transistor 5 for boosting a voltage; a resistor 6 and a capacitor 7 for starting; a high voltage rectifier diode 9 which serves as a booster circuit and forms a DC-to-DC converter circuit performing blocking oscillations in a known manner; and a main capacitor 11.

The circuit arrangement further includes a high voltage rectifier diode 8; and a neon lamp 10. The high voltage rectifier diode 8 is connected in such a way as to present an electric charge accumulated at the main capacitor 11 from being discharged.

A resistor 12 is arranged to have a high resistance value and prevent any excess current from flowing from the main capacitor 11 to an X contact 13. The resistor 12 serves a combined function as a charging resistor for a trigger capacitor 14.

A trigger transformer 15 is arranged such that: When the X contact 13 is closed in synchronism with the operation of a shutter of the camera, the electric charge of the trigger capacitor 14 is instantaneously discharged via the primary winding of the transformer 15. The secondary winding of the transformer 15 then produces a ringing voltage of several KV excite a xenon flash lamp 16.

Figure 4:
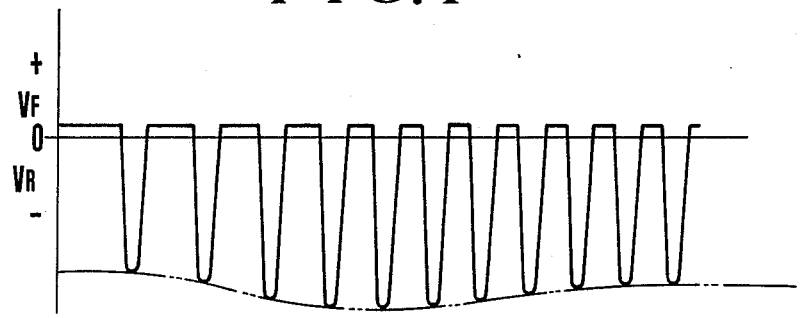
FIG. 4 is a waveform chart showing a voltage between the terminals of a high voltage rectifier diode shown in FIG. 3.

The xenon flash lamp 16 is arranged to be caused to flash by the electric charge accumulated at the main capacitor 11. The operation of the embodiment which is arranged as described above is as described below with reference to FIGS. 4 and 5:

When the power supply switch 2 is closed, a base current flows to the base electrode of the oscillating transistor 3 via the feedback winding F of the booster oscillation transformer 5, the resistor 6 and the capacitor 7. As a result of this, blocking oscillation begins. The blocking oscillation induces an oscillating high voltage in the secondary winding S of the oscillation transformer 5. Then, the main capacitor 11 is charged with a forward voltage induced in the secondary winding S. A spike voltage of about 1 KV, which is generated in the inverse direction, is blocked by the high voltage rectifier diode 9. A voltage waveform generated between the sides A and K of the diode 9 becomes as shown in FIG. 4. The inverse spike voltage closes the power supply switch 2 and is then generated to a degree of about 1 KV. The peak value of the inverse spike voltage is relatively stable. The frequency of the inverse spike voltage is between several K Hz and several ten K Hz. Accordingly, the inverse spike voltage generated between the sides A and K of the high voltage rectifier diode 9 is also applied to both ends of a series connected part consisting of the other high voltage rectifier diode 8 and the neon lamp 10. The spike voltage is divided by the ratio of the reverse impedance of the diode 8 to the impedance of the neon lamp 10. In other words, there is produced a reverse leakage current at the high voltage rectifier diode 8 by the spike voltage. The leakage current, which is in a small amount, is positively utilized for lighting up the neon lamp 10 which is dischargeable even by means of a slight amount of current. The display arrangement thus displays the operating state of the DC-to-DC converter circuit by lighting up in a stable manner.

Figure 5:
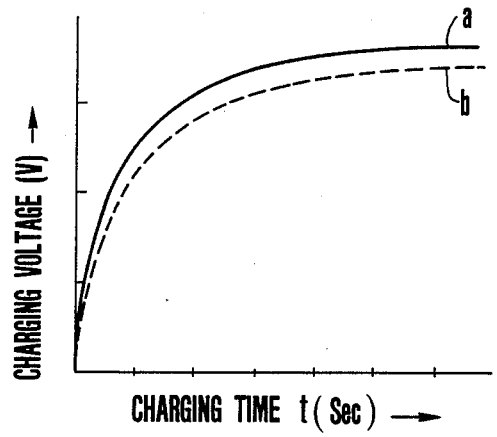
FIG. 5 is a graph showing the charging voltage characteristic of a main capacitor which is also shown in FIG. 3.

The blocking oscillation comes to a stop when the power supply switch 2 is opened. With the power supply switch opened, therefore, the neon lamp 10 extinguishes to indicate that the DC-to-DC converter circuit is inoperative. In this instance, since the electric charge accumulated at the main capacitor 11 not discharged through the neon lamp 10, any drop in the accumulated electric charge of the main capacitor 11 almost entirely results from the self-discharge of the main capacitor 11. Therefore, a DC high voltage can be retained over a long period of time. The neon lamp 10 is arranged not to be lighted up by any electric charge that is in a direction of charging off the main capacitor 11. Therefore, the period of time required for charging the main capacitor 10 remains unaffected. FIG. 5 shows this with a curve representing the charging voltage with which the main capacitor 11 is charged. Referring to FIG. 5, a curve "a" is obtained with the display circuit of this invention connected to the high voltage rectifier diode. Another curve "b" is obtained with an example of the conventional display circuit connected.

Figure 6:
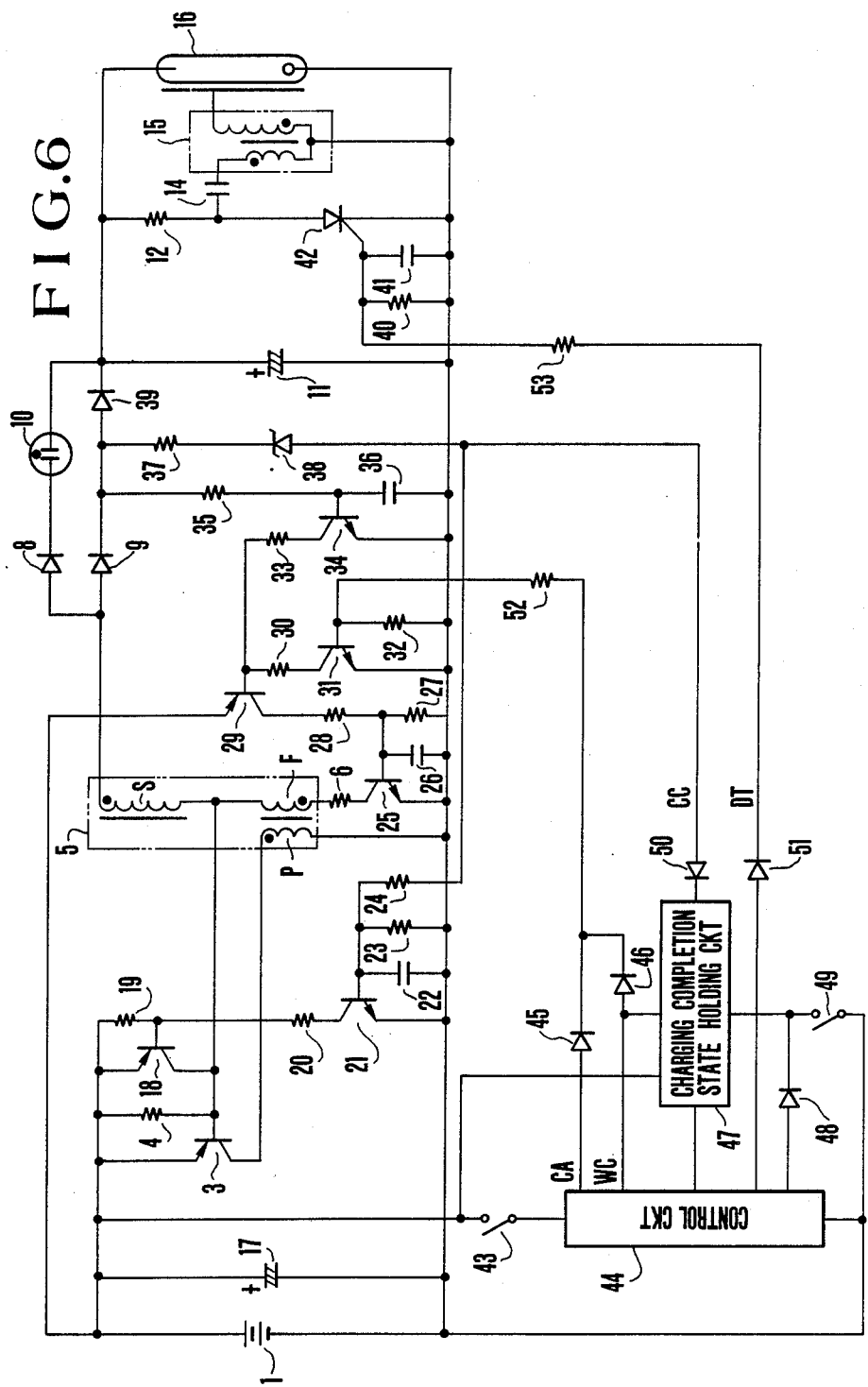
FIG. 6 is a circuit diagram showing the details of the circuit arrangement shown in FIG. 3.

FIG. 6 shows in detail the arrangement of the flash circuit shown in FIG. 3. In FIG. 6, the same elements as those shown in FIG. 3 are indicated by reference numerals 1 to 16 and are omitted from the description given below:

A capacitor 17 is parallel connected to the power source battery 1 to enhance the impedance of the power source. A transistor 18 is connected between the base and emitter of the oscillating transistor 3. The oscillation of the DC-to-DC converter is controlled by this transistor 18. A resistor 19 is arranged to cut the leak of the transistor 18. A resistor 20 is arranged to limit the base current of the transistor 18. A switching transistor 21 is arranged to control the operation of the transistor 18. A capacitor 22 is arranged to prevent the transistor 21 from erroneously operating. A leak cut resistor 23 is provided for the transistor 21. A resistor 24 is arranged to divide the base voltage of the transistor 21. A transistor 25 is connected via a resistor 6 between and in series with the feedback winding F of the boosting oscillation transformer 5 and the negative pole of the power source battery 1. The transistor 25 is arranged to be conductive while the DC-to-DC converter is in operation. A transistor 26 is arranged to prevent the transistor 25 from erroneously operating. The transistor 25 is provided with a leak cut resistor 27. A switching transistor 29 is connected in series between the base electrodes of the transistor 25 through the positive pole of the battery 1 and a resistor 28.

Resistors 30 and 33 are arranged to limit the base current of the transistor 29. A switching transistor 31 is arranged to be rendered operative by a signal CA which is produced from a photo-taking system control circuit 44 only when the use of the electronic flash device becomes necessary. When the electronic flash device is in use, the transistor 31 also operates in response to a film winding completion signal WC produced from the photo-taking system control circuit 44 and thus restarts the DC-to-DC converter. The transistor 31 is provided with a leak cut resistor 32. Another switching transistor 34 is arranged to become conductive when an induced current produced at the secondary winding S of the boosting oscillation transformer 5 flows via the high voltage rectifier diode 9 and a resistor 35 to the base electrode of the transistor 34. The transistor 34 is also arranged to remain conductive during the operation of the DC-to-DC converter. The transistor 34 is provided with a biasing capacitor 36.

A constant voltage diode 38 is arranged to detect that the charge voltage of the main capacitor 11 which accumulates the DC high voltage as a flashing energy has reached a predetermined value. A diode 39 is arranged to prevent the electric charge accumulated at the main capacitor 11 from being discharged into a circuit consisting of the charge voltage detecting constant voltage diode 38, a resistor 35 and the transistor 34. A resistor 40 is arranged to compensate for a forward voltage of a thyrister 42. A capacitor 41 is arranged to prevent the thyrister 42 from erroneously operating. A power supply switch 43 for the photo-taking system control circuit 44 is arranged to be closed in response to a pushing operation on a shutter release button. Diodes 45, 46, 50 and 51 are arranged to prevent reverse currents. A charging completion state holding circuit 47 is arranged to keep the main capacitor 11 in a charging completed state over a predetermined period of time when the pulse voltage of the charging completion signal CC is applied thereto. A flash photography mode selection switch 49 is arranged to close when the electronic flash device is to be used. The circuit arrangement of FIG. 6 operates as follows:

The flash mode switch 49 automatically comes to close when the brightness of an object to be photographed is too low for ordinary photographing or in the event of a back-light shot condition requiring the use of the electronic flash device for giving an auxiliary illumination light. The power supply switch 43 closes when the shutter release button is depressed. With the switch 43 closed, the photo-taking system control circuit 44 produces a start signal CA for starting the DC-to-DC converter. The transistor 31 is rendered momentarily conductive by this start signal CA. Concurrently with this, the transistor 29 becomes conductive. A base current is then supplied from the power source battery 1 via the resistor 28 to the base electrode of the transistor 25. This renders the transistor 25 conductive.

With the transistor 25 thus becoming conductive, a base current is supplied from the power source battery 1 to the base electrode of the oscillating transistor 3 via the feedback winding F of the boosting oscillation transformer 5 and the resistor 6. The oscillating transistor becomes conductive. This allows a current to be supplied from the power source battery 1 to the primary winding P of the boosting oscillation transformer 5. An electromagnetic energy is generated at the primary winding P to bring about an induced voltage at the secondary winding S of the transformer 5. There takes place blocking oscillation.

Concurrently with the commencement of the blocking oscillation, an oscillation voltage, which is as shown in FIG. 4, is generated between the anode terminal of the high voltage rectifier diode 9 and the cathode terminal of the diode 39 in the same manner as described in the foregoing with reference to FIG. 3. This oscillation voltage is then applied also to both ends of a series connected part consisting of the high voltage rectifier diode 8 and the neon lamp 10.

Then, in the same manner as the description of FIG. 3, the neon lamp 10 comes to light up to indicate the operation of the DC-to-DC converter circuit.

With the DC-to-DC converter thus operated, when the charge voltage of the main capacitor 11 reaches a predetermined value, an operating current flows to the constant voltage diode 38. The transistor 21 becomes conductive to render the transistor 18 conductive. The part between the emitter and base of the oscillating transistor 3 is thus short-circuited to bring the transistor 3 into a cut-off state. The blocking oscillation of the DC-to-DC converter comes to a stop. The neon lamp 10 extinguishes to indicate that the DC-to-DC converter has stopped operating. Further, the base current of the transistor 34 disappears. This brings the transistor 25 into a cut-off state. Then, a consumption current at the DC-to-DC converter circuit completely disappears at that point of time.

When an operating current flows to the constant voltage diode 38 with the charge voltage of the main capacitor 11 having reached the predetermined value, the charging completion state holding circuit 47 comes to operate to keep over, for a predetermined period of time, the main capacitor 11 in a charged state in which it is capable of causing an adequate amount of light to be emitted. A shutter release operation is possible even when the object is at a low brightness as long as the charging completion state holding circuit 47 is in operation. If a photo-taking operation is performed under this condition, shutter blades open to an aperture value corresponding to a photo-taking distance. Then, the photo-taking system control circuit 44 produces a flash trigger signal DT which caused the xenon flash lamp 16 to flash. Then, the shutter blades close the aperture. Following that, the photo-taking system control circuit 44 produces the film winding completion signal WC.

The film winding completion signal WC again renders the transistor 31 conductive. The DC-to-DC converter is again started. At the same time, a reset signal is applied to the charging completion state holding circuit 47.

Under a photo-taking condition where a natural light permits an adequate exposure, the flash mode switch 49 is opened. Then, the signal CA for the start of the DC-to-DC converter, the start signal WC, which is produced upon completion of film winding, and the flash trigger signal DT all disappear. The photo-taking system control circuit 44 then permits a shutter release operation to be performed irrespectively of the operation of the charging completion state holding circuit 47.

In this specific embodiment, a discharge tube, such as a neon lamp or the like, is lighted up to display the operating state of the DC-to-DC converter by advantageously utilizing a spike voltage which is an oscillating high voltage generated in the reverse direction between the anode and cathode of the high voltage rectifier diode 9. This arrangement enables the embodiment to make a stable display concurrently with the operation of the DC-to-DC converter. The length of time required for charging the main capacitor is never affected by the display arrangement. The use of the discharge tube such as a neon lamp or the like, that can be caused to emit a readily recognizable light even with a very small discharge current to, provides an energy saving effect. The display device of this embodiment consists of the discharge tube, such as a neon lamp or the like, and the high voltage rectifier diode. The circuit of the display device, therefore, can be simply arranged. Since the electric charge accumulated at the main capacitor is never consumed by the display arrangement, the embodiment can be advantageously applied especially to a camera of the automatic flashing type which must have the main capacitor of the flash device quickly charged. The brightness of the display light is not significantly affected by variations of the battery voltage resulting from variations in the load thereon, so that the display can be made in a stable manner.

Figure 7:
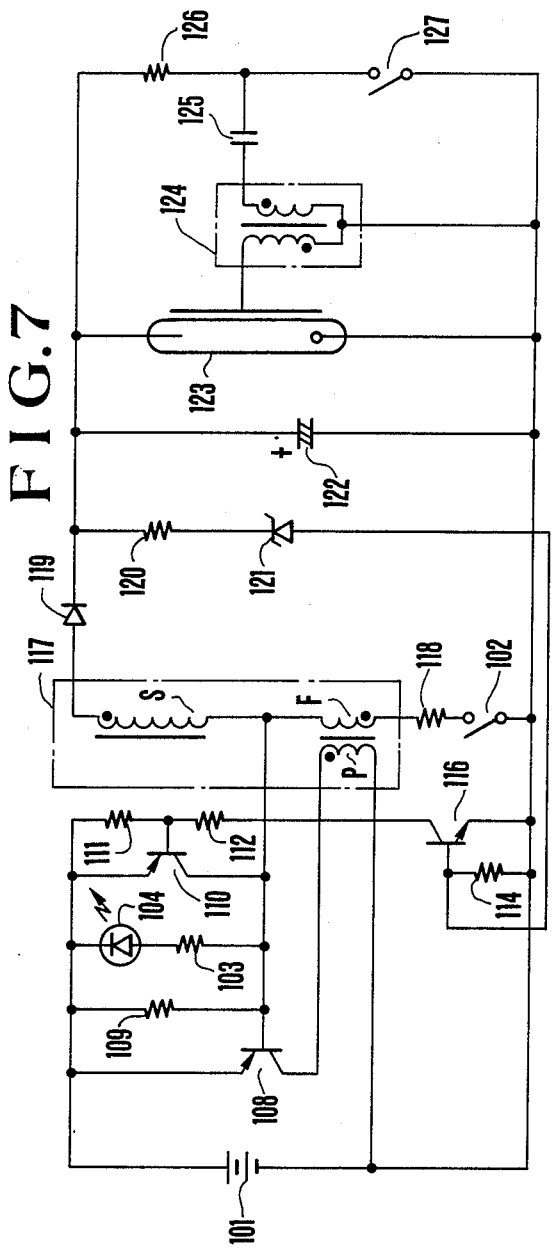
FIG. 7 is a circuit diagram showing an electronic flash circuit for a camera arranged according to this invention as a second embodiment thereof.

FIG. 7 shows an electronic flash circuit for a camera arranged according to this invention as a second embodiment of the invention. The embodiment includes a battery 101 which is employed as a power source; a power supply switch 102; a resistor 103; a light emitting diode (LED) 104 which is arranged to indicate that a DC-to-DC converter circuit is in operation; an oscillating transistor 108; a boosting oscillation transformer 117; a high voltage rectifier diode 119 which is a principal component element forming a DC-to-DC converter circuit operating with blocking oscillation in a known manner. A leak cut resistor 109 is provided for the oscillating transistor 108; and a transistor 110. When the charge voltage of the main capacitor 122 reaches a predetermined value, a constant voltage diode 121 operates to supply a base current to the base electrode of a transistor 116 to close thereby transistor 116. With the transistor 116 thus closed, the transistor 110 is closed to short-circuit the part between the emitter and base electrodes of the oscillating transistor 108. Therefore, the blocking oscillation of the DC-to-DC converter circuit comes to a stop. A leak cut resistor 111 is provided for the transistor 110. A resistor 112 is arranged to limit the base current of the transistor 110. A leak cut resistor 114 is provided for the above-stated transistor 116. A resistor 118 is arranged to start the operation of the oscillating transistor 108. A xenon flash lamp 123 is arranged to convert the accumulated electric charge of the main capacitor 122 into an illumination light. A resistor 126 is of a high resistance value and is arranged to prevent an excess current coming from the main capacitor 122 to an X contact and to perform a combined function as a charging resistor for a trigger capacitor 125. A trigger coil 124 is arranged to generate a high ringing voltage to excite the xenon flash lamp 123 thereby.

The operation of the embodiment which is arranged as described above is as follows: When the power supply switch 102 is closed, the battery 101 supplies a base current to the base electrode of the oscillating transistor 108. This renders the oscillating transistor 108 conductive to allow a current to flow to the primary winding P of the boosting oscillation transformer 117. As a result, induced voltages arise at the secondary winding S and the feedback winding F of the transformer 117, which then begins to perform a blocking oscillation operation in a known manner. The blocking oscillation induces an AC high voltage on the secondary winding S of the boosting oscillation transformer 117. The main capacitor 122 is charged with a forward induced current resulting from the induced voltage.

Figure 8:
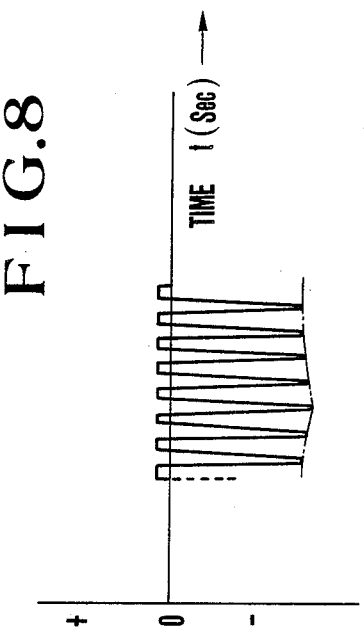
FIG. 8 is a waveform chart showing a voltage generated between the emitter and base of an oscillating transistor shown in FIG. 7.

While the above-stated blocking oscillation continues with the power supply switch 102 in the closed state, an inversely biased spike voltage is generated between the emitter electrode and base electrode of the oscillating transistor 108 as shown in FIG. 8. Therefore, the inverse bias spike voltage is applied to the light emitting diode 104 via the resistor 103 in the forward direction. This causes the light emitting diode 104 to light up. The frequency of the oscillation is between several KHz and several ten KHz. Therefore, the light of the diode does not visibly flicker and appears as a continuous light.

When the electric charge of the main capacitor 122 reaches a predetermined value through the charging process thereon, a Zener current flows via the resistor 120 to the constant voltage diode 121. This renders the transistor 116 conductive. The transistor 110 then becomes conductive to short-circuit the part between the emitter and base electrodes of the oscillating transistor 108. The transistor 108 thus becomes non-conductive to bring the blocking oscillation operation to a stop. Then, concurrently with this, the inverse bias spike voltage which has been between the emitter and base electrodes of the oscillating transistor 108 comes to disappear. The light emitting diode 104 extinguishes.

In other words, the light emitting diode 104 stays lit only during the blocking oscillation. In accordance with the arrangement of this embodiment, the inversely biased spike voltage which has been brought about in between the emitter and base electrodes of the oscillating transistor, is positively utilized by virtue of the blocking oscillation operation. This arrangement enables the embodiment to promptly make a stable display in response to the closing of the power supply switch. The display light is kept at a stable brightness without being affected by variations in the battery voltage despite of the use of a very small number of parts including the light emitting diode and the resistors.

Figure 9:
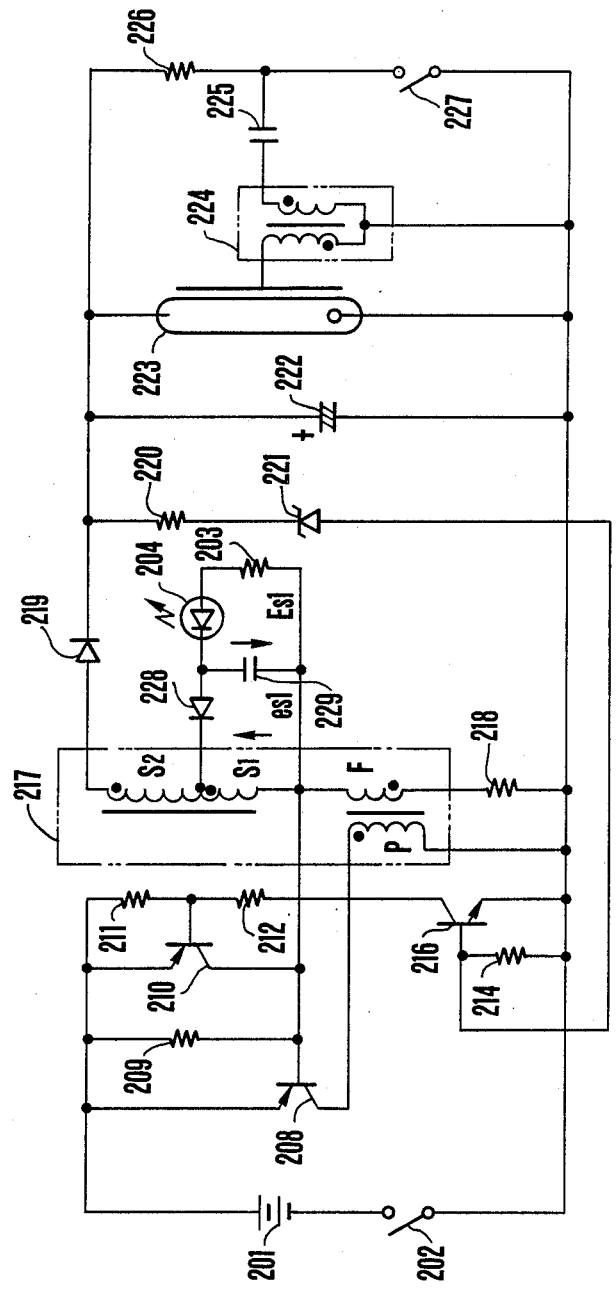
FIG. 9 is a circuit diagram showing an electronic flash circuit for a camera arranged according to this invention as a third embodiment thereof.
Figure 10:
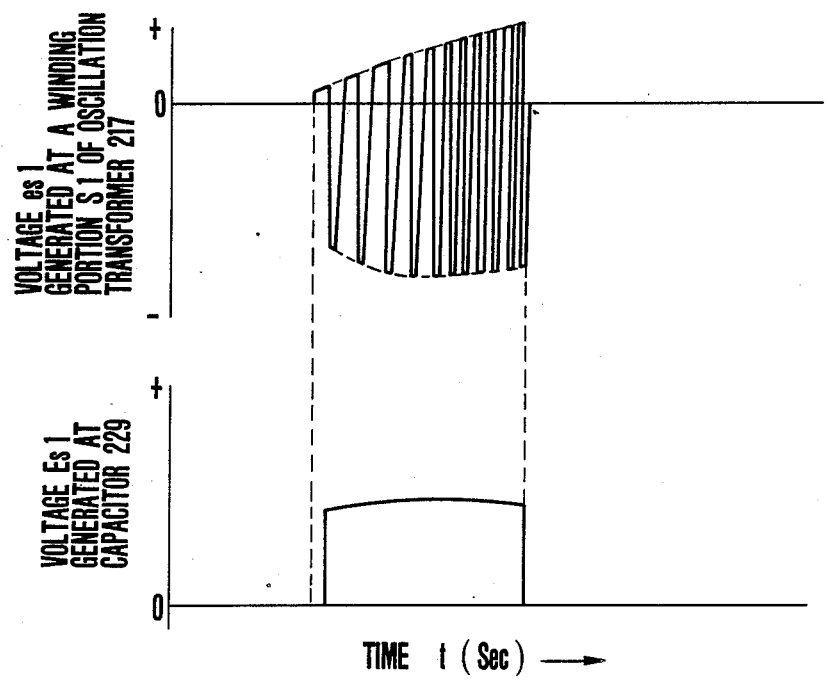
FIG. 10 is a waveform chart showing the voltage of a display part shown in FIG. 9 obtained at each point thereof.

FIG. 9 shows another electronic flash circuit for a camera arranged according to this invention as a third embodiment thereof. The circuit arrangement includes a power source 201 which is a battery; a power supply switch 202; a resistor 203; a light emitting element 204 (such as an LED or the like) which is arranged to indicate the operation of a DC-to-DC converter; an oscillating transistor 208; a boosting oscillation transformer 217; a high voltage rectifier diode 219 which is a principal component forming a DC-to-DC converter circuit operating with blocking oscillation in a known manner; a leak cut resistor 209 provided for the oscillating transistor 208; and a switching transistor 210 which is arranged to close when another transistor 216 closes with the charge voltage of the main capacitor 222 reaching a predetermined value to render a constant voltage diode 221 operative and with a base current thus supplied to the base electrode of the transistor 216. With this transistor 210 thus closed, a part between the emitter electrode and base electrode of the oscillating transistor 208 is short-circuited. This brings the blocking oscillation of the DC-to-DC converter to a stop. The transistor 210 is provided with a leak cut resistor 211 and a base current limiting resistor 212. The transistor 216 is provided with a leak cut resistor 214. A resistor 218 is arranged for starting the oscillating transistor 208. A xenon flash lamp 223 is arranged to convert the accumulated electric charge of the main capacitor 222 into an illumination light. A resistor 226 is of a high resistance value and is arranged to restrict an excess current coming from the main capacitor 222 to an X contact 227. The resistor 226 also serves as a charging resistor for a trigger capacitor 225. A trigger coil 224 is arranged to produce a high ringing voltage for exciting the xenon flash lamp 223. A rectifier diode 228 utilizes a portion of the secondary winding of the boosting oscillation transformer 217 and is arranged to have an inverse spike voltage which is generated at a portion S1 winding of the transformer as shown in FIG. 10 alone used as a power source for the charging process display element 204. A capacitor 229 is arranged to smooth the voltage to be used as the power supply to the charging process display element 204 as represented by a waveform shown in FIG. 10. FIG. 10 shows an oscillation voltage eS1 generated at the portion S1 of the secondary winding S1 of the boosting oscillation transformer 217 and the above-stated smoothened voltage ES1 which is obtained by rectifying the oscillation voltage eS1.

The third embodiment, which is arranged as described above, operates in the following manner: When the power supply switch 202 is closed, a base current is supplied from the battery 201 to the base electrode of the oscillating transistor 208 via the feedback winding F of the boosting oscillation transformer 217 and the resistor 218. This renders the oscillating transistor 208 operative. A current flows to the primary winding P of the boosting oscillation transformer 217. Induced voltages are generated respectively at the secondary winding (S1+S2) and the feedback winding F in values greater than that of the primary winding and are turn-ratio times as much the primary winding. This causes a known operation of blocking oscillation to take place there. The blocking oscillation induces a high oscillation voltage at the secondary winding (S1+S2) of the boosting oscillation transformer 217. Then, the main capacitor 222 is charged with a forward induced current resulting from this induced voltage.

During the continuation of this blocking oscillation, a spike voltage is generated by the action of the core of the boosting oscillation transformer 217. The generating direction of the spike voltage is inverse to the forward induced voltage which is resulting in the accumulating electric charge at the main capacitor 222. The inversely generated spike voltage of a major portion S2 of the secondary winding is blocked by the high voltage rectifier diode 219 to prevent the main capacitor 222 from being over-charged and also to prevent the outflow of the accumulated electric charge. Meanwhile, the inverse spike voltage generated at a minor portion S1 of the secondary winding (S1+S2) is smoothed by the capacitor 229 and is used as power supply ES1 which causes the charging process display element 204 to light up via the resistor 203. In other words, the diode 228 is connected in such a manner that the main capacitor 222 is charged both with the forwardly induced voltage generated at the minor portion S1 of the secondary winding and the forward induced voltage generated at the major portion S2 of the secondary winding of the boosting oscillation transformer 217 with these induced voltages caused by the diode 228 to have an additive polarity.

In this specific embodiment as described above, the spike voltage which is inversely generated over the whole secondary winding (S1+S2) of the boosting oscillation transformer 217 is not fully used but is only partially utilized as the power supply to the charging process display element 204. The reason for this arrangement is as follows: The charging characteristic of the DC-to-DC converter deteriorates if the charging process display circuit element is not arranged to have an extremely high impedance; and also if the whole spike voltage is used for that purpose, an idling current increases. Further, if the circuit is arranged to have a high impedance, it becomes difficult to obtain a current for lighting up the display element 204 to a sufficient brightness.

However, in accordance with this invention, this embodiment uses only the inverse spike voltage generated at a portion S1 of the secondary winding of the transformer 217. This arrangement enables the display element 204 to be kept lit at a sufficient degree of brightness without incurring any tangible deterioration of performance in respect to the charging characteristic of the DC-to-DC converter and the idling current.

When the charging voltage of the main capacitor 222 reaches a predetermined value through the charging process, a Zener current flows via the resistor 220 to the constant voltage diode 221 to render the transistor 216 conductive. The transistor 210 then becomes also conductive to bring the part between the emitter and base electrodes of the oscillating transistor 208 into a short-circuited state. With the oscillating transistor 208 thus becoming non-conductive, the blocking oscillation comes to a stop. Then, the inverse spike voltage which is generated in the portion S1 of the secondary winding of the transformer 217 disappears to put out the light of the display element 204.

The display element 204 is thus arranged to be lit only while the blocking oscillation continues.

Compared with the voltage variation of the power source battery and the variations of potential which take place in other parts, the inverse spike voltage, which is brought about at the portion S1 of the secondary winding of the boosting oscillation transformer by the blocking oscillation thereof, fluctuates to a much less degree. This fact is advantageously utilized by the embodiment. Therefore, the charging process display can be made with stable brightness and the display can be made in prompt response to the operation of the power supply switch. In addition to that, the arrangement to use the portion of the secondary winding in common ensures the satisfactory performance of the DC-to-DC converter without providing the boosting oscillation transformer with any additional winding.

This invention is applicable to a oscillating booster circuit of an electronic flash device for a camera of the kind arranged to boost a DC low voltage power supply by means of a boosting oscillation circuit and to convert the boosted power supply into a DC high voltage by means of a high voltage rectifier diode for charging the main capacitor of the electronic flash device therewith. In accordance with this invention, as described in the foregoing, the booster circuit is provided with a display circuit which is arranged to be operated solely by means of the spike voltage of the booster circuit in displaying the operating state of the booster circuit. The display arrangement according to this invention is capable of displaying the operating state of the booster circuit of the flash device always in a stable manner for the camera despite of the extreme simplicity of arrangement and without bringing about any adverse effect on the main capacitor charging operation of the booster circuit. The invention is, therefore, highly advantageous.

What is claimed is:

1. A booster circuit operation display arrangement in a flash device for a camera, comprising:
   (a) an oscillating booster circuit including a boosting oscillation transformer having a secondary winding;
   (b) flash means connected to said oscillating booster circuit for receiving a forward current therefrom for flashing;
   (c) a display circuit arranged to be operated by a spike voltage of said oscillating booster circuit, said display circuit being connected to an intermediate point of the secondary winding of said boosting oscillation transformer;
   (d) mono-directional current passing means connected in series with said display circuit in such a direction that a forward current of said oscillating booster circuit does not enter said display circuits; and
   (e) a charging circuit connected in parallel with said display circuit.

2. A booster circuit operation display arrangement in a flash device for a camera, comprising:
   (a) an oscillating booster circuit;
   (b) flash means connected to said oscillating booster circuit for receiving a forward current therefrom for flashing;
   (c) a display circuit arranged to be operated by a spike voltage of said oscillating booster circuit, said display circuit including a first mono-directional current passing means for preventing a forward current of said oscillating booster circuit from flowing into said display circuit; and
   (d) a second mono-directional current passing means connected in parallel with said first mono-directional current passing means so as to maintain the voltage acting on said first mono-directional current passing means at a level lower than a predetermined value when the forward current of said oscillating booster current flows, said second mono-directional current passing means including a transistor and said display circuit being connected between the base and emitter of said transistor.

3. A booster circuit operation display arrangement in a flash device for a camera, comprising:
   (a) an oscillating booster circuit;
   (b) flash means connected to said oscillating booster circuit for receiving a forward current therefrom for flashing;
   (c) a display circuit arranged to operated by a spike voltage of said oscillating booster circuit, said display circuit including a first mono-directional current passing means for preventing a forward current of said oscillating booster circuit from flowing into said display circuit, said display circuit further including a semi-conductor element; and
   (d) a second mono-directional current passing means connected in parallel with said first mono-directional current passing means so as to maintain the voltage acting on said first mono-directional current means at a level lower than a predetermined value when the forward current of said oscillating booster circuit flows.

* * * * *